(12) United States Patent
Miller

(10) Patent No.: US 8,925,882 B1
(45) Date of Patent: Jan. 6, 2015

(54) MOUNT FOR TELEMETRY RECEIVER

(71) Applicant: U.S. Army Research Development and Engineering Command, Washington, DC (US)

(72) Inventor: Dennis B. Miller, Rising Sun, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 24 days.

(21) Appl. No.: 13/796,516

(22) Filed: Mar. 12, 2013

(51) Int. Cl.
A47B 96/06 (2006.01)
F16M 13/02 (2006.01)

(52) U.S. Cl.
CPC .................................... F16M 13/02 (2013.01)
USPC ..................... 248/219.1; 248/682; 248/224.7; 248/298.1

(58) Field of Classification Search
USPC .................................... 248/682, 224.7, 298.1
See application file for complete search history.

(56) References Cited

U.S. PATENT DOCUMENTS

| D361,462 S | * | 8/1995 | Newham | D6/567 |
| 5,636,826 A | * | 6/1997 | Nakagaki et al. | 248/562 |
| 5,871,188 A | * | 2/1999 | Lyle | 248/223.41 |
| 6,460,817 B1 | * | 10/2002 | Bosson | 248/317 |
| 7,988,114 B2 | * | 8/2011 | Coleman et al. | 248/298.1 |
| 2003/0188473 A1 | * | 10/2003 | Heller | 43/137 |
| 2004/0061032 A1 | * | 4/2004 | Bradford et al. | 248/218.4 |
| 2013/0075552 A1 | * | 3/2013 | Kenney et al. | 248/205.3 |
| 2013/0161468 A1 | * | 6/2013 | Chen et al. | 248/298.1 |

* cited by examiner

Primary Examiner — Monica Millner
(74) Attorney, Agent, or Firm — Ulysses John Biffoni

(57) ABSTRACT

A mount for a telemetry receiver having a data connector and used in conjunction with a cage for housing animals and having at least one wall. The mount includes a base plate and a pair of rails which are attached to the base plate. These rails are dimensioned to slidably receive opposed sides of the telemetry receiver. The base plate includes at least one opening aligned with the telemetry receiver data connector when the telemetry receiver is inserted between the rails. The opening is dimensioned to receive a data cable therethrough. A fastener then secures the base plate to the inside of the wall of the cage.

7 Claims, 2 Drawing Sheets

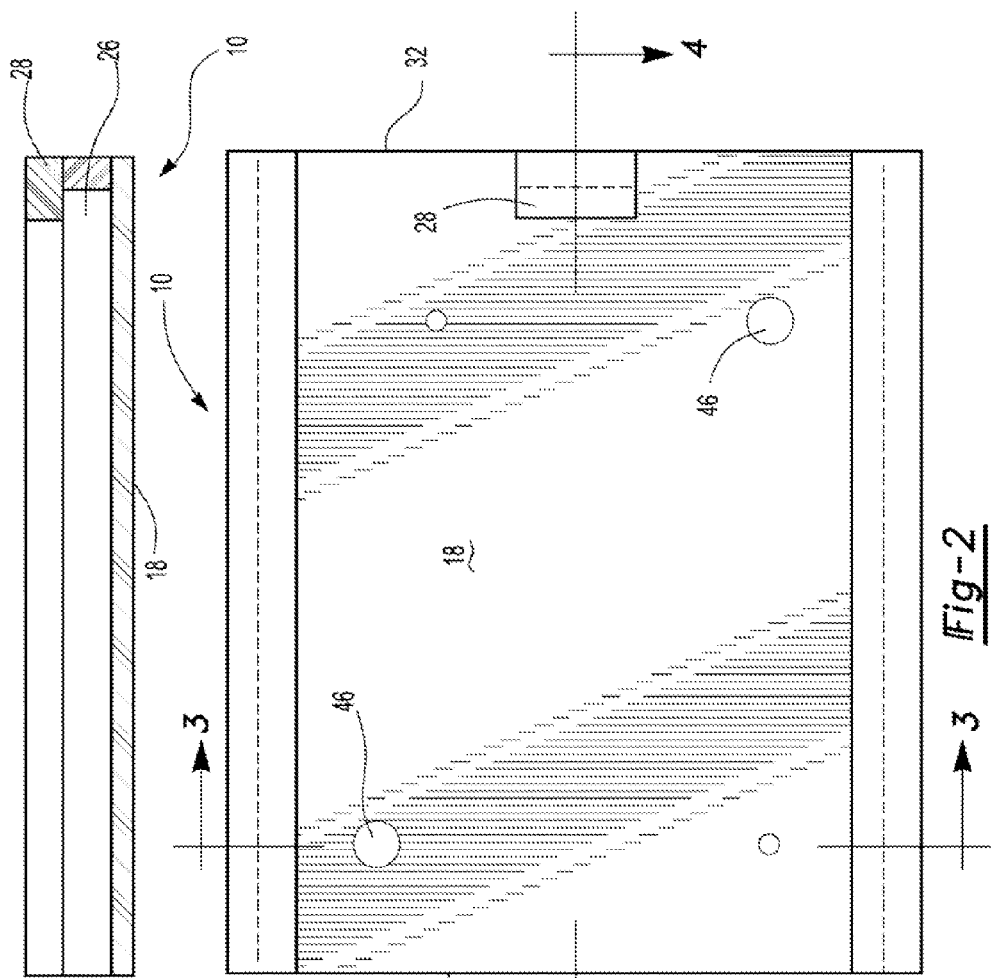
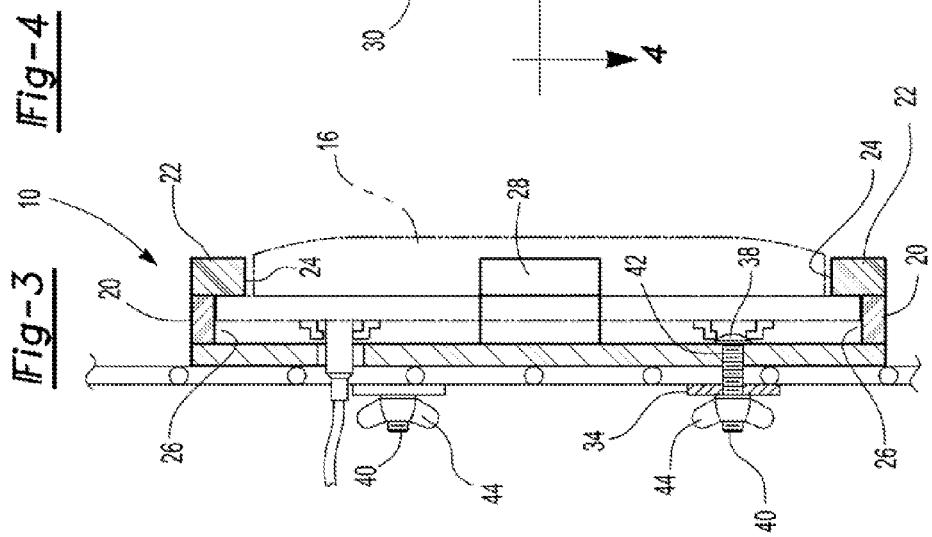

MOUNT FOR TELEMETRY RECEIVER

GOVERNMENT INTEREST

The invention described herein may be manufactured, used, and licensed by or for the United States Government.

BACKGROUND OF THE INVENTION

I. Field of the Invention

The present invention relates to a mount for a telemetry receiver used in conjunction with a cage.

II. Description of Related Art

DSI telemetry receivers of the type used with caged animals are typically equipped with welded slots on their rear surface. These slots are dimensioned to receive the head of a quarter inch carriage bolt which is slidably received within the slot.

In order to attach the telemetry receiver to the wall of a cage for an animal, the telemetry receiver is positioned on the inside surface of the wall and so that the carriage bolts slidably positioned within the telemetry receiver slots extend through the wall and outside of the cage. The bolts are then secured to the cage utilizing oversized fender washers and nuts to securely bolt the receiver to the inside of the animal cage. Thereafter, the data cable for the telemetry receiver is attached to the receiver to communicate the data collected by the receiver to a computer or other recording device.

When moving the animal from one cage to another for routine cleaning of the cage or moving the animal from a testing area to a housing area, the scientist or technician currently has two options to move the animal and continue to collect the telemetry data once the animal is moved. One way is to stop the data collection from the telemetry receiver and close the computer file. The computer program is then restarted with a second receiver at the new animal cage and a new data file is initiated. Unfortunately, this method takes time and requires twice the number of receivers, i.e. one receiver for the old cage and a new receiver for the new cage.

A still further disadvantage of this previously known method is that two data files are created for the same animal. Thus, when restarting the data collection with a new receiver, the software must be configured for the new receiver. This method is disadvantageously time consuming for the analysis of the collected data since the collected data must be analyzed for two or even more different computer files. Furthermore, since two or even more data files must be analyzed, there exists the risk of mixing data results for different animals.

Alternatively, when moving the animal the computer data collection program is paused. The data cable for the telemetry receiver is then unplugged from the receiver.

Thereafter, a wrench is used to loosen the carriage bolts holding the receiver to the wall of the cage and, once loose, the telemetry receiver is slid out from the carriage bolts and removed from the cage. The telemetry receiver is then mounted on the new or second cage, the data cable reconnected to the computer, and the computer is unpaused.

While this alternate method minimizes the number of telemetry receivers required to monitor the animals and results in a single data file on one computer, it suffers from its own disadvantages. First, the overall procedure of removing the telemetry receiver from one cage and reattaching the telemetry receiver to a second cage is time consuming and difficult to accomplish, particularly since protective clothing is usually required for animal handling. Furthermore, this procedure also requires tools for loosening and tightening the nuts onto the carriage bolts and the attendant risk of dropping and losing the fastener hardware.

SUMMARY OF THE PRESENT INVENTION

The present invention provides a mount for a telemetry receiver for mounting the telemetry receiver onto a cage wall which overcomes the above-mentioned disadvantages of the previously known methods.

In brief, the mount for the telemetry receiver in accordance with the present invention comprises a base plate which may be constructed of any suitable material. However, a synthetic material, such as plexiglass, is preferred due to its low cost and easy cleaning.

A pair of rails are then attached to the base plate. These rails are spaced apart and generally parallel to each other and are dimensioned to slidably receive opposed sides, preferably the top and bottom, of the telemetry receiver. An end stop is also preferably attached to the base plate to limit the insertion of the telemetry receiver into the rails.

The base plate includes at least one opening which is aligned with the telemetry receiver data connector when the telemetry receiver is slid between the rails and against the end stop. This opening is dimensioned to receive the data cable through the base plate. Any conventional means, such as a nut and bolt, is then used to attach the base plate on the inside surface of the cage wall.

In practice, the telemetry receiver is slid horizontally in between the rails until the telemetry receiver abuts against the end stop. At that time, the data connector for the telemetry receiver is aligned with the opening in the base plate.

Thereafter, the data cable for the telemetry receiver is inserted through the base plate opening and attached to the telemetry receiver. In doing so, the data cable locks the telemetry receiver to the base plate against sliding movement relative to the base plate and its walls.

When a subsequent transfer of the animal from the cage is desired, it is merely necessary to pause the computer and remove the data cable. The telemetry receiver is then easily and rapidly removed from the mount by sliding the telemetry receiver along the rails. The telemetry receiver is then easily and rapidly installed at the new cage without the use of tools by simply sliding the telemetry receiver in a second mount at the new cage, attaching the data cable for the telemetry receiver, and unpausing the computer data collection program.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 is a plan view of a preferred embodiment of the mount of the present invention and with parts removed for clarity;

FIG. 3 is a sectional view taken substantially along line 3-3 in FIG. 2; and FIG. 4 is a sectional view taken along line 4-4 in FIG. 2.

DETAILED DESCRIPTION OF A PREFERRED EMBODIMENT OF THE PRESENT INVENTION

Figure 1:
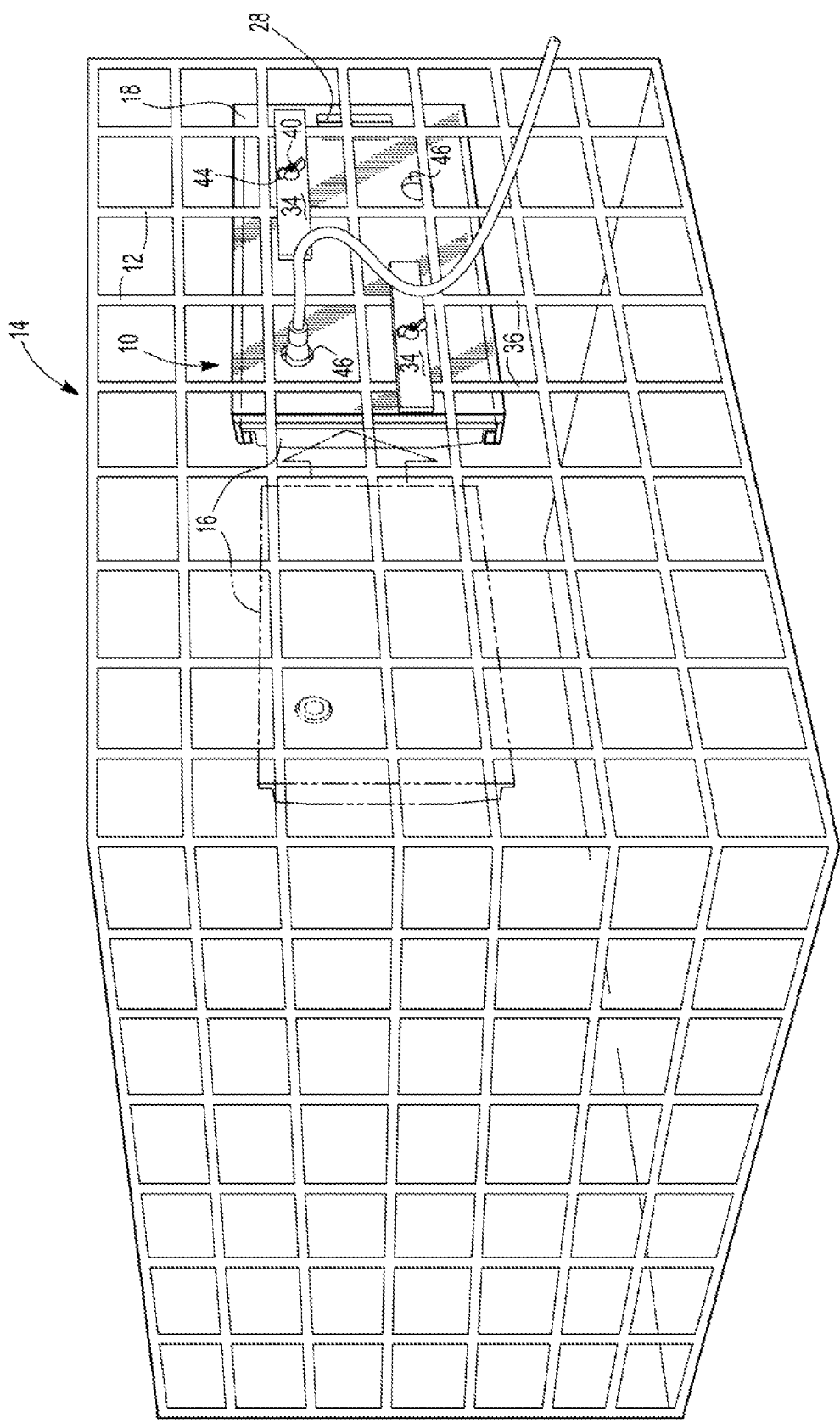
FIG. 1 is a fragmentary elevational view illustrating a preferred embodiment of the mount of the present invention attached to a cage wall.

With reference first to FIG. 1, a preferred embodiment of the telemetry mount 10 in accordance with the present invention is illustrated mounted to a wall 12 of a cage 14. The cage 14 is of the type used to contain laboratory animals for research or other purposes. The laboratory animal (not shown) is fitted with a conventional telemetry transmitter and sensors to continuously transmit data regarding the animal to a telemetry receiver 16 held by the mount 10.

With reference now particularly to FIG. 2, the mount 10 includes a generally rectangular base plate 18. This base plate 18 is preferably slightly larger than the telemetry receiver 16 and is constructed from any suitable material. However, a synthetic material, such as plexiglass, is preferred both for its inexpensive cost and easy cleaning.

As best shown in FIGS. 2 and 3, a pair of elongated rails 20 are attached to the base plate 18 so that the rails 20 are spaced apart and generally parallel to each other. Furthermore, the spacing between the rails 20 is slightly greater than the overall width of the telemetry receiver 16. Any conventional means, such as solvent welding, may be used to attach the rails 20 to the base plate 18.

As best shown in FIG. 3, each rail 20 includes a portion 22 which extends inwardly from the rail 20 towards the opposite rail 20 and overlies the base plate 18. The spacing between an inner side 24 of the rail overlapping portion 22, furthermore, is less than the width of the telemetry receiver 16.

Still referring to FIG. 3, the rail 20 with its overlying portion 22 and the base plate 18 forms a generally U-shaped channel 26. This U-shaped channel 26, furthermore, is dimensioned to slidably receive opposed sides, such as the top and bottom, of the telemetry receiver 16. Consequently, the telemetry receiver can be slid into or out of the U-shaped channels 26 and, when positioned between the rails 20, the overlying portions 22 of the rails 20 retain the telemetry receiver 16 to the base plate 18.

With reference again to FIGS. 1-4, an end stop 28 is preferably secured to the base plate 18 in between and adjacent one end of the rails 20. This end stop 28 thus limits the insertion of the telemetry receiver 16 from one end 30 (FIG. 2) of the base plate 18 and towards its other end 32. Any conventional means, such as solvent welding, may be used to attach the end stop 28 to the base plate 18.

With reference now to FIGS. 1 and 3, any conventional means may be utilized to secure the mount to the inside of the cage wall 12. However, as shown an elongated support bar 34, preferably constructed of a synthetic material such as plexiglass, extends along the outside of the cage wall 12. The support bar 34, furthermore, is dimensioned so that it extends across at least two of the bars 36 forming the cage wall 12.

At least one, and preferably several mounting holes 38 in the base plate 18 register with mounting holes 40 formed through the support bar 34. A carriage bolt 42 is then positioned through the registering holes 38 and 40 in the base plate 18 and support bar 34, respectively, and tightened using a nut 44, such as a wing nut. Upon tightening of the nuts 44, the cage bars 36 are sandwiched in between the support bar 34 and the base plate 18 thus firmly securing the base plate 18 to the inside of the cage wall.

With reference again to FIGS. 1 and 2, the base plate 18 includes at least one opening 46 which is aligned with the data output connector on the telemetry receiver 16 when the receiver 16 is fully inserted in between the rails 20 and against the end stop 28. These openings 46, furthermore, are dimensioned to allow the data cable for the telemetry receiver to be inserted through the opening 46 and connected to the data output connector on the telemetry receiver 16.

Upon connection of the data cable to the telemetry receiver 16 once the telemetry receiver 16 is fully inserted into the mount 10, the mechanical interference between the data cable and the base plate 18 simply but effectively locks the telemetry unit to the base plate 18 against sliding movement. Furthermore, this is achieved without the use of tools.

In operation, when it is desired to move the animal from one cage to another, the computer program collecting the data is paused and the data cable is removed from the telemetry receiver 16. Upon removal, the entire receiver may be simply and rapidly slidably removed from the mount 10 without the use of tools. The now removed telemetry receiver may then be easily and simply slid in between the rails 20 and against the end stop 28 in a subsequent cage. Thereafter, the data collection cable is reattached to the telemetry receiver 16, thus effectively locking the telemetry receiver 16 to the second mount 10, and data collection is resumed by unpausing the computer.

From the foregoing, it can be seen that the present invention provides a simple and yet effective mount for a telemetry receiver of the type used in cages for laboratory animals. Having described our invention, however, many modifications thereto will become apparent to those skilled in the art to which it pertains without deviation from the spirit of the invention as defined by the scope of the appended claims.

NUMBER KEY

10 mount
12 cage wall
14 cage
16 telemetry receiver
18 base plate
20 rail
22 overlying portion
24 inside edge
26 U-shaped channel
28 end stop
30 side
32 side
34 support bar
36 cage bar
38 opening
40 opening
42 bolt
44 nut

I claim:

1. A cage mount system for a telemetry receiver, said system comprising:
    a cage having at least one wall;
    a base plate;
    a pair of rails attached to said base plate, said rails being dimensioned to slidably receive opposed sides of the telemetry receiver, said telemetry receiver having a data connector for receiving a data cable;
    said base plate having at least one opening aligned with the telemetry receiver data connector when the telemetry receiver is inserted between said rails, said opening being dimensioned to receive the data cable therethrough; and wherein said telemetry receiver is secured to said base plate by connection of the data cable to the data connector; and
    a fastener which secures said base plate to the wall of the cage.

2. The mount as defined in claim 1, wherein each rail includes a lip which overlies said plate so that each said rail together with said base plate forms a generally U-shaped channel.

3. The mount as defined in claim 2, wherein said channel has a width at least as wide as the thickness of the telemetry receiver along its opposed sides.

4. The mount as defined in claim 1, further comprising an elongated support bar positioned on the side of the cage wall opposite from said base plate, said fastener extending through registering holes in said base plate and said support bar.

5. The mount as defined in claim 4, wherein said fastener comprises a bolt.

6. The mount as defined in claim 1, further comprising an end stop secured to said base plate adjacent one end of said side rails, said end stop limiting the extent of an insertion of the telemetry receiver between said rails.

7. The mount as defined in claim 1, wherein said base plate comprises plexiglass.

\* \* \* \* \*